United States Patent [19]
Keinanen

[11] 3,842,880
[45] Oct. 22, 1974

[54] VEHICLE TIRE INTENDED TO BE FITTED WITH ANTI-SKID DEVICES AND TIRE MATRIX FOR MANUFACTURING SAME

[76] Inventor: Sulo Paavo Johannes Keinanen, Nummela, Finland

[22] Filed: Aug. 28, 1972

[21] Appl. No.: 284,064

[30] Foreign Application Priority Data
Aug. 27, 1971 Finland.............................. 2399/71

[52] U.S. Cl.................. 152/210, 152/208, 152/211
[51] Int. Cl. ........................................... B60c 11/16
[58] Field of Search..................... 152/208, 210, 211

[56] References Cited
UNITED STATES PATENTS
3,186,466  6/1965  Keinanen............................ 152/210
3,665,992  5/1972  Rossel................................. 152/208
3,693,688  9/1972  Schuman ............................ 152/210

*Primary Examiner*—M. Henson Wood, Jr.
*Assistant Examiner*—D. W. Keen
*Attorney, Agent, or Firm*—Cushman, Darby & Cushman

[57] ABSTRACT

A vehicle tire into the tread of which a plurality holes have been made in connection with the manufacturing of the tire so as to accommodate anti-skid devices having a flange extension at the bottom end. The hole consists of a straight section stretching from the tread inwards, to a lateral extension at its bottom end, and, below the said extension, of a longitudinal continued extension of the hole. When the said device is inserted in position in the hole, there is an empty air space remaining underneath the device.

24 Claims, 5 Drawing Figures

VEHICLE TIRE INTENDED TO BE FITTED WITH ANTI-SKID DEVICES AND TIRE MATRIX FOR MANUFACTURING SAME

BACKGROUND OF THE INVENTION

The subject of the present invention is a vehicle tire intended to be fitted with anti-skid devices and a matrix for manufacturing of the tire.

A great disadvantage of anti-skid devices that are known and are in operation is that although they function efficiently on a surfaced road covered by ice and snow, when the road is free from ice and snow, the devices still hit the road forcibly. This results in rapid wear of the road surface and in strong wear of the device itself which is in this case subject to a stress bigger than on an ice-surfaced road. Wear on the rubber around the device results from a forcible to-and-fro movement and lateral oscillation of the device. Heating of the rubber mass also effects a loosening of the device from the rubber. Also, a slanting position of the devices results from a declining movement. Rupture of the hard metal tip, and strong onesided wear of the section around the tip of the device, etc. alo results from these effects. In connection with devices having a steel housing, the specific weight is considerably higher than the corresponding specific weight of rubber, because of the action of a higher centrifugal force, exerted by the device hitting against the road higher. As a matter of fact, the rubber buttons fitted along with devices having a steel housing, are elongated by the centrifugal force more than the other buttons, and thereby are effective to produce the rumbling and howling noises arising during driving on a road free of ice and snow. Even if the damage of the devices and the tread described above is not taken into consideration, the strong wear of the road alone has resulted in the circumstance whereby several countries regulations based on law have already been issued, by means of which the use of the present anti-skid devices with steel housing are restricted (season and speed limits).

SUMMARY OF THE INVENTION

The purpose of the present invention is to produce a "road friendly" anti-skid device that does not have the disadvantages described above, irrespective of whether the driving is done on a road free of ice or covered with ice. This purpose has been achieved by means of arranging one or more air cushions below the bottom ends of the devices, inside the tread, which react very sensitively to loadings directed at the device and allow a vertical flexibility of the device in relation to the loads. During driving on an ice-free road the air cushion is compressed and allows the device to be pushed inwards, whereas on a road covered with ice the tip of the device penetrates through the ice onto the road, because the compression force of the tip is sufficient even if the compression force were relatively low. Due to vertical flexibility, at the same time all the detrimental factors directed at the device and described above are avoided.

The vehicle tire according to the invention, is fitted with a purposeful sufficient number of holes as projects inwardly substantially perpendicular from the surface of the tread. The tire is also designed to accomodate anti-skid devices that have a flange extension at their bottom end. Each of the said holes consists of a section that stretches inward from the tread surface, the bottom end of the hole has a lateral extension for receiving a flange extension of the device, and underneath the lateral extension of the hole, as viewed longitudinally in direction of the hole, there is a continued extension at one or more points. After the flange of the said device is located in position in the lateral extension of the hole, there is formed an air cushion or air cushions underneath the flange.

BRIEF DESCRIPTION OF THE DRAWINGS

The invention will be described in the following under reference to the attached drawings, wherein FIGS. 1 to 3 describe different embodiments of the hole configurations may in the tread showing the tire both without the device and with the device located in the hole.

DETAILED DESCRIPTION OF THE PREFERRED EMBODIMENT

Figure 1:
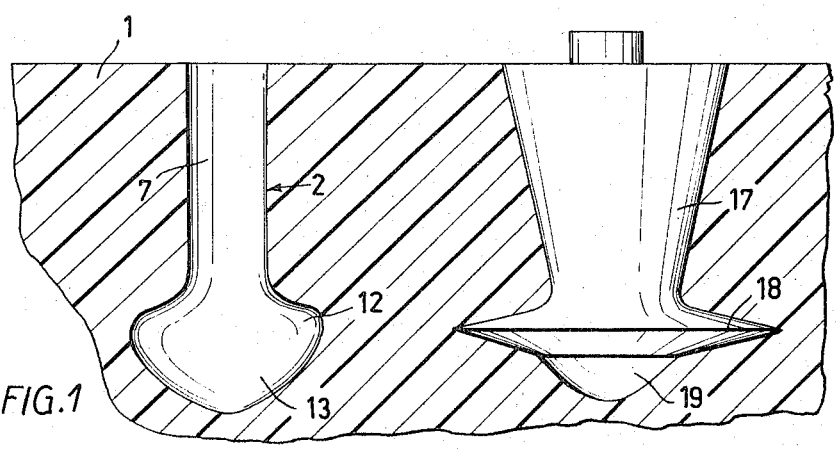
Figure 2:
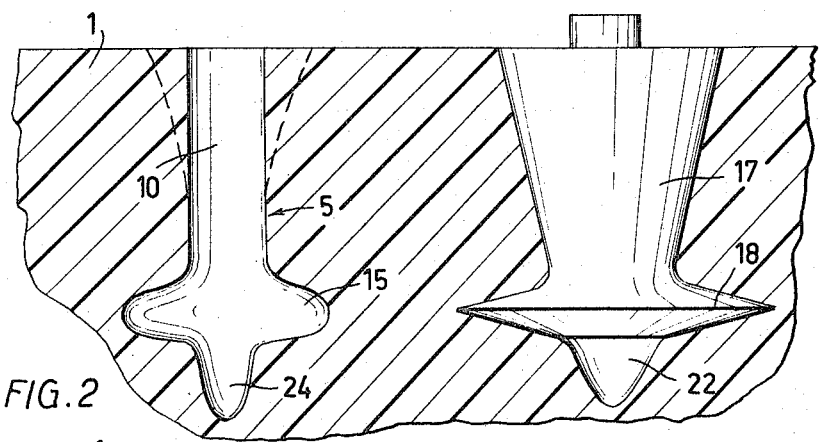
Figure 3:
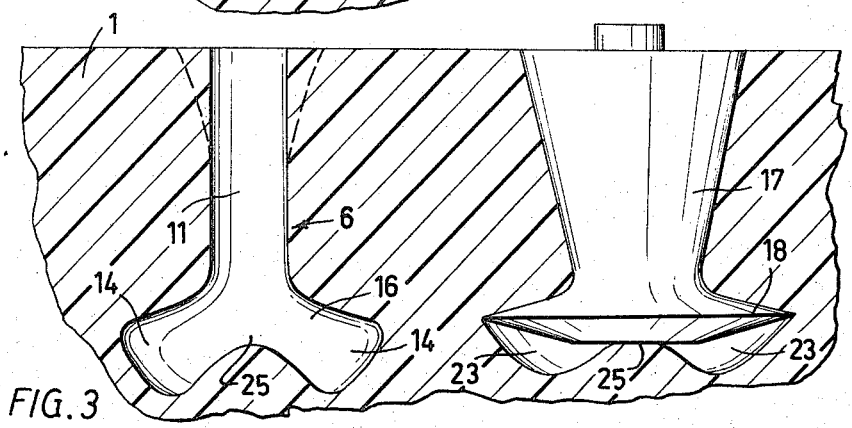

With reference to FIGS. 1 to 3, the tread 1 of the tire is fitted with equivalent holes 2, 5 and 6 of different shapes. The hole consists of a vertical section 7, 10 and 11, projecting downwards from the tread and having mainly the shape of a cylinder (shown in the figures as a continuous line) or of a cone widening upwards (shown in FIGS. 2 and 3 with a dotted line). The said vertical section is continued downwards by an extension widening portion 12, 15 and 16, respectively. In the right section of FIGS. 1 to 3 the anti-skid device 17 is shown as accommodated in the hole, the bottom end of the said device having a flange component 18. When the device is accommodated in the hole, the flange componet 18 is also accommodated in the said extension widening portion.

According to the invention, underneath the said extension there are one or more continued extensions portions 13, 24 and 14 which stretch downwards as viewed in the longitudinal direction of the device. When the device is accommodated in position, its flange component does not fill the said continued extension portions, but a corresponding air cushion 19, 22 and 23 remains underneath the flange component.

The continued extension portions of the hole may have any suitable form whatsoever and it is not restricted to the shapes shown in FIGS. 1 to 3.

According to FIG. 1, the vertical section of the hole is widened at its bottom end to the sides and downwards and is thereafter curved towards the center, whereby the bottom of the extension portion is shaped as a globular generally elliptical face. Now the top 12 of the extension portion lies against the flange section 18 of the device, whereas the bottom section of the extension portion constitutes a continued extension portion 13 for the formation and air cushion 19. FIG. 2 shows a modification of the previous embodiment, according to which there is a continued extension 24 projecting downwards in the middle of the globular face. According to FIG. 3 the hole consists of a vertical section directed downwards from the tread and has an annular recess extending from this section downwards and towards the sides, in the middle of the recess there is an elevation 25 that functions as a rubber cushion. Thus, underneath the flange 18 there is a rubber cushion 25 and, surrounding it, an annular air cushion 23. It is of course evident that the diameter of the hole, especially regarding the top section 7, 10 and 11, is dimensioned smaller than the dimension of the device at the corresponding section in order that, when the device is located in position into the hole, the surrounding rubber is in tension.

Figure 4:
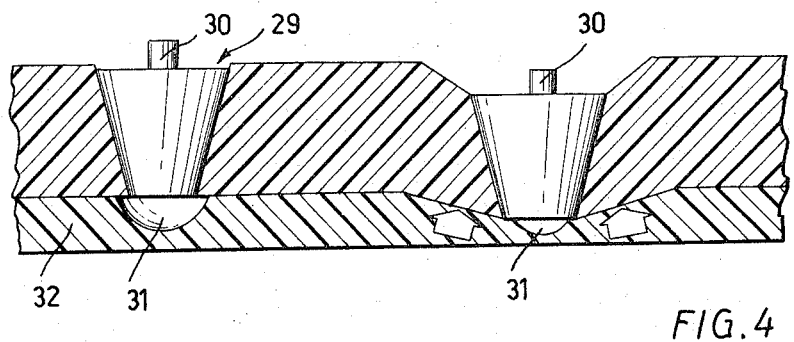
FIGS. 4 and 5 show the device both in the normal state when driving on a road covered with ice and as loaded on an asphalt road free from ice.
Figure 5:
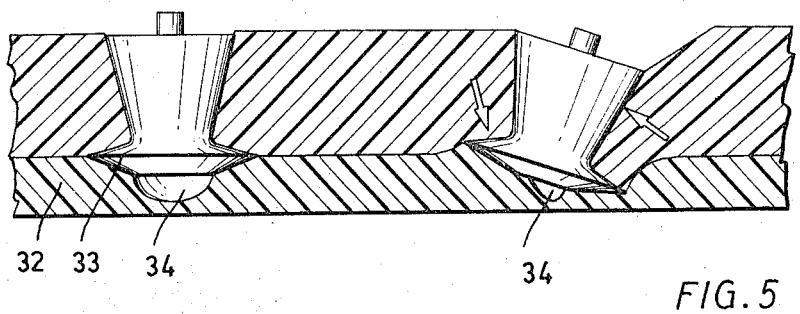

In known tires fitted with anti-skid devices the general procedure has been that the tread is fitted with straight cylindrical holes that extend close to the body of the tire and the device is accommodated expressly down to the bottom of the hole. Thus, immediately underneath the device there is a totally unflexible tire body, thereby device has no possibility of yielding inwards into the rubber. This lack of flexibility results in all the disadvantages described above. Previously it has been suggested that specific holes be formed for the devices (cf. Finnish Pat. No. 42,885 and U.S. Pat. No. 3,186,466), but in these patents the device has been accommodated against the bottom of the hole, which also resulted in the said disadvantages. Even if the bottom end of the device were located at some distance from the tire body (not shown), it has been ascertained that even the rubber mix near the body does not allow a sufficient degree of flexibility. However, if an air space is allowed to remain underneath the device in accordance with the invention, a "shock absorber" formed by the air cushion is obtained. In such a case, during driving on a road with a hard surface (asphalt-surfaced road free of ice) the air cushion with the surrounding rubber mass is sufficiently resilient so that the hard metal tip of the device can be pressed to the level of the tire surface. FIG. 4 shows a diagrammatic view of the aforenoted case. The left section of FIG. 4 shows a device 29 (the flange 18 of FIG. 1–3 has not been shown) has been shown that has a hard metal tip 30 and an air space 31 underneath the device. The reference number 32 refers to the rubber layer immediately above the tire body. The device is in its normal position during driving on a road covered with ice. The right section of FIG. 4 shows driving on a hard road, i.e., on asphalt free from ice. When the hard metal tip 30 touches the road, the air cushion 31 is compressed and the device is pressed inwards. The tensioned rubber mass (shown by arrows) immediately restores the device back to the normal position. FIG. 5 shows a lateral load. Reference number 33 indicates the flange section and 34 the air cushion. Lateral loads produce a strong contrary force (indicated by arrows) in the air cushion and in the surrounding rubber. In this case the stability of the device remains sensitive, because compressed air reacts sensitively.

The invention is also concerned with a matrix for a vehicle tire characterized in that a tire matrix in itself known is fitted with such pegs that project from the surface of the matrix for the formation of holes into the tire tread as have a lateral extension at the outer end, which extension also continues downwards in the longitudinal direction of the peg.

Since a matrix in itself known is concerned, fitted with pegs forming the holes according to the invention, it is not necessary to describe it in more detail, being a self-evident matter for an expert. The function of the said pegs is, namely, to form the holes according to the invention in the tire in connection with the vulcanization, the shape of which holes of course corresponds to the shape of the pegs.

Although I have herein shown and described my invention in what I have conceived to be the most practical and preferred embodiments, it is recognized that departures may be made therefrom within the scope of my invention, which is not to be limited to the details disclosed, but is to be accorded the full scope of the claims so as to embrace any and all equivalent structures and devices.

I claim:

1. A vehicle tire the tread of which has a purposeful number of openings (2,5,6) formed by respective walls in said tread and projecting substantially perpendicularly inwards from the tread and shaped for accommodation of anti-skid devices (17) that have a flange extension (18) at their bottom end, wherein each of said walls comprises:

a section (7,10,11) extending inwardly from the tread surface, a lateral extension (12,15,16) at the bottom end of said section and inwardly extending therefrom a predetermined distance for breadth and depth-wise accommodating the said flange extension of the device, and underneath the said extension, viewed longitudinally in direction of the opening, continued inward extension means (13,24,14) in said wall for forming at least one air pocket (19,22,23) so that when the flange of the said device is located in position in the said lateral extension (12,15,16) said air pocket extension means forms at least one air cushion underneath the flange.

2. A vehicle tire according to claim 1, characterized in that the section (7, 10, 11) of the opening above the said extension and directed towards the tread has the shape of a cone widening upwards.

3. A vehicle tire according to claim 1, characterized in that the opening consists of a vertical section that extends at its bottom end towards the sides and downwards and is thereafter curved downwards towards the centre, whereby the bottom of the extension is shaped as a globular face.

4. A vehicle tire according to claim 3, characterized in that in the middle of the said globular face there is an extension projecting downwards.

5. A vehicle tire according to claim 1, characterized in that each opening comprises a vertical section extending downwards from the tread and having the shape of a cylinder or of a cone widening upwards, and of an annular recess extending from this section downwards and towards the sides, in the middle of which recess there is an elevation (25).

6. A matrix of vehicle tire for the manufacturing of any of the tires according to claim 1, characterized in that a tire matrix in itself known is fitted with such pegs projecting from the surface of the matrix for the formation of openings into the tire tread as have a lateral extension at the outer end, which extension also continues longitudinally outwards in the longitudinal direction of the peg.

7. A matrix according to claim 6 characterized in that said peg has a vertical section that extends at its bottom end towards the sides and longitudinally outward and is thereafter curved longitudinally outwards towards the center in the shape of a globular face.

8. A matrix according to claim 7, characterized in that the shaft section of the peg has the form of a cylinder or of a cone widening towards the surface of the matrix.

9. A matrix according to claim 7 characterized in that in the middle of said globulas face said peg projects still further outward longitudinally.

10. A matrix according to claim 6, characterized in that said peg has a vertical shaft section extending longitudinally outward from said matrix surface with the shape of a cylinder or of a narrowing cone and has at the outer end thereof has an annulus extending laterally and longitudinally outwardly with a recess in the middle of the outermost surface of the annulus.

11. A matrix according to claim 6, characterized in that the shaft section of the peg has the form of a cylinder or of a cone widening towards the surface of the matrix.

12. A vehicle tire according to claim 1, wherein each of said sections that extends inwardly from the tread surface (7, 10, 11) has a substantially cylindrical shape.

13. A vehicle tire according to claim 1 wherein each of said air pocket extension means has a curved elliptical surface.

14. A vehicle tire according to claim 13, wherein the elliptical face of each of said air pocket extension means has a centrally disposed, vertically upwardly directed extension means that is effective to produce an annular air cushion underneath the flange.

15. A vehicle according to claim 1 wherein each of said sections that extend inwardly from the tread surface has the shape of an inverted cone.

16. A vehicle tire according to claim 1, wherein each of said air pocket extension means is defined by a centrally disposed vertically inwardly directed cup shaped surface.

17. A vehicle tire, the tread of which contains a substantial number of openings (2, 5, 6) that project substantially perpendicularly inwardly from the tread surface and are configured for accommodating anti-skid devices having an annular body (17) and at the bottom thereof an annular flange extension (18) having a given breadth and given depth, each of said openings being defined by a wall comprising:
an annular section (7, 10, 11) extending inwardly from the tread surface and of annular dimension to tightly accommodate said annular body (17),
an annular lateral and inward extension (12, 15, 16) at the bottom of said bottom of said section and of predetermined breadth and depth dimensions to tightly accommodate said flange extension (18), and
closed annular extension means (13, 24, 14) in said wall and inwardly containing said first mentioned annular extension (12, 15, 16) for forming at least one air pocket (19, 22, 23) so that when said flange extension (18) is seated in said first annular extension (12, 15, 16) said air pocket extension means (13, 24, 14) forms at least one air cushion underneath the flange.

18. A vehicle tire as in claim 17 including a plurality of the said anti-skid devices each having an annular body (17) and at the bottom thereof an annular flange extension (18) having a given breadth and given depth, said annular body (17) of each said device being tightly fit within a respective one of said openings (2, 5, 6) and its said flange extension (18) being tightly seated in said annular lateral and inward extension (12, 15, 16) width said air pocket extension means (13, 24, 14) leaving at least one air cushion underneath the flange.

19. A tire as in claim 18, wherein the annular section has a cylindrical shape.

20. A tire as in claim 18 wherein the annular section is in the form of an inverted cone.

21. A tire as in claim 20, wherein the elliptical shaped surface of each of said air pocket extension means has a centrally disposed vertically upwardly directed extension means that is effective to produce an annular air cushion underneath the annular flange.

22. A tire as in claim 18, wherein said air pocket extension means has a generally elliptical shaped surface.

23. A tire as in claim 18 wherein each of said air pocket extension means is defined by a centrally disposed vertically inwardly directed cup shaped surface.

24. A tire as in claim 18 wherein said tire has a carcass and includes rubber between said carcass and each of said air pocket extension means.

* * * * *